US006114791A

United States Patent [19]

Ito et al.

[11] Patent Number: 6,114,791

[45] Date of Patent: Sep. 5, 2000

[54] COMMUTATOR FOR MOTOR USING AMORPHOUS CARBON AND FUEL PUMP UNIT USING THE SAME

[75] Inventors: Motoya Ito, Hekinan; Tatsuya Matsumoto, Kariya; Kenzo Kiyose, Takahama, all of Japan

[73] Assignee: Denso Corporation, Japan

[21] Appl. No.: 08/976,638

[22] Filed: Nov. 24, 1997

[30] Foreign Application Priority Data

| | | | |
|---|---|---|---|
| Nov. 29, 1996 | [JP] | Japan | 8-319869 |
| Dec. 29, 1996 | [JP] | Japan | 8-328289 |

[51] Int. Cl.$^{7}$ .......... H02K 13/00

[52] U.S. Cl. .......... 310/233; 310/236; 310/237; 310/235

[58] Field of Search .......... 310/233, 236, 310/237, 252; 29/596, 598

[56] References Cited

U.S. PATENT DOCUMENTS

| | | | |
|---|---|---|---|
| 4,757,721 | 7/1988 | Horner et al. | 73/862 |
| 5,175,463 | 12/1992 | Farago et al. . | |
| 5,245,240 | 9/1993 | Takasaki | 310/233 |
| 5,255,426 | 10/1993 | Farago et al. | 310/233 |
| 5,283,494 | 2/1994 | Frank et al. | 310/233 |
| 5,634,800 | 6/1997 | Giamati | 439/22 |
| 5,879,747 | 3/1999 | Murakami et al. | 427/384 |

FOREIGN PATENT DOCUMENTS

| | | | |
|---|---|---|---|
| 58-174189 | 10/1983 | Japan . | |
| 60-186875 U | 12/1985 | Japan . | |
| 2-14269 U | 1/1990 | Japan . | |
| 2046228A | 7/1980 | United Kingdom . | |
| 2046SS8A | 7/1980 | United Kingdom | 310/233 |

OTHER PUBLICATIONS

U.S. Ser. No. 720,153, Matsumoto et al., filed Sep. 25, 1996.

*Primary Examiner*—Elvin Enad

*Attorney, Agent, or Firm*—Nixon & Vanderhye P.C.

[57] ABSTRACT

In a motor for driving a fuel pump, each contact part of a commutator which slidingly contacts brushes is made of a carbon material. The carbon material is a mixture of natural carbon and amorphous carbon so that the contact part has a longer durability. The weight percentage of the amorphous carbon to be mixed is in the range of 5–30, most preferably about 20. The brush may also be made of a mixture of natural carbon and amorphous carbon.

9 Claims, 3 Drawing Sheets

COMMUTATOR FOR MOTOR USING AMORPHOUS CARBON AND FUEL PUMP UNIT USING THE SAME

CROSS REFERENCE TO RELATED APPLICATION

The present application is based on Japanese Patent Applications No. 8-319869 filed on Nov. 29, 1996 and No. 8-328289 filed on Dec. 9, 1996, the contents of which are incorporated herein by reference.

BACKGROUND OF THE INVENTION

1. Field of the Invention

The present invention relates to an improved commutator for a motor and a fuel pump unit using the same.

2. Related Art

As a fuel pump unit for an automotive vehicle, an electromagnetically operated-type fuel pump unit includes an electric motor and a motor-driven pump. In this motor, an armature wound with coils rotates when electric power is supplied from an electric power source to the armature by sliding contacts between brushes and contact parts of a commutator. This motor rotates an impeller of the pump which in turn sucks fuel from a fuel tank and supplies fuel to an internal combustion engine of the automotive vehicle.

Each contact part of the commutator is generally made of copper. Since the life of the brush will become shorter due to the sliding wear of the brush as the hardness of the brush is lower, it is proposed to improve anti-wear characteristics of the brush by mixing amorphous carbon having a high hardness into a carbon material. The copper contact parts are likely to react with, for instance, fuel which is oxidized or includes sulfur components, resulting in corrosion. In case the copper turns to electrically conductive copper sulfide, the electrically insulated contact parts are likely to short-circuit.

U.S. Pat. No. 5,175,463 proposes forming contact parts of a commutator with a carbon material for restricting reaction of contact parts with fuel. The contact part made of the carbon material is inferior to the contact part made of copper in both hardness and mechanical strength. When the contact part made of the carbon material slides on the brush with the mixed amorphous carbon, the wear of contact parts progresses faster resulting in shorter life of the commutator.

Provided that the contact part is made of artificial carbon which is harder than natural carbon, the life of the commutator will be lengthened. However, as artificial carbon is expensive, the manufacturing cost will become higher.

SUMMARY OF THE INVENTION

It is therefore an object of the present invention to provide a commutator for a motor which has an excellent durability while using a carbon material for its contact parts.

It is another object of the present invention to provide a fuel pump unit which has excellent durability.

According to the present invention, a contact part of a commutator is made of a carbon material including amorphous carbon.

Preferably, the carbon material also includes natural carbon. More preferably, the weight percentage of the amorphous carbon in the entire carbon material is restricted to 5–30 so that too much amorphous carbon will not cause cracks in the contact part at the time of sintering.

Preferably, the contact part is electrically connected with a metal terminal having an electric conductivity higher than that of iron.

Preferably, the commutator is used in a fuel pump unit.

Preferably, a brush is made of a carbon material mixed with amorphous carbon having an electric resistance higher than that of the carbon material. This will increase the electric resistance between the contact part and the brush, so that electric power supplied to an armature may be converted into a rotary motion of the armature by the faster switching of polarities of electric current in the commutating operation. Further, the increased electric resistance reduces electric sparks between the brush and the contacting part and suppresses increase in the temperature of the brush and the commutator.

BRIEF DESCRIPTION OF THE DRAWINGS

Other objects, features and advantages of the present invention will become more apparent from the following detailed description when read with reference to the accompanying drawings, in which.

DETAILED DESCRIPTION OF THE PREFERRED EMBODIMENTS

Figure 1:
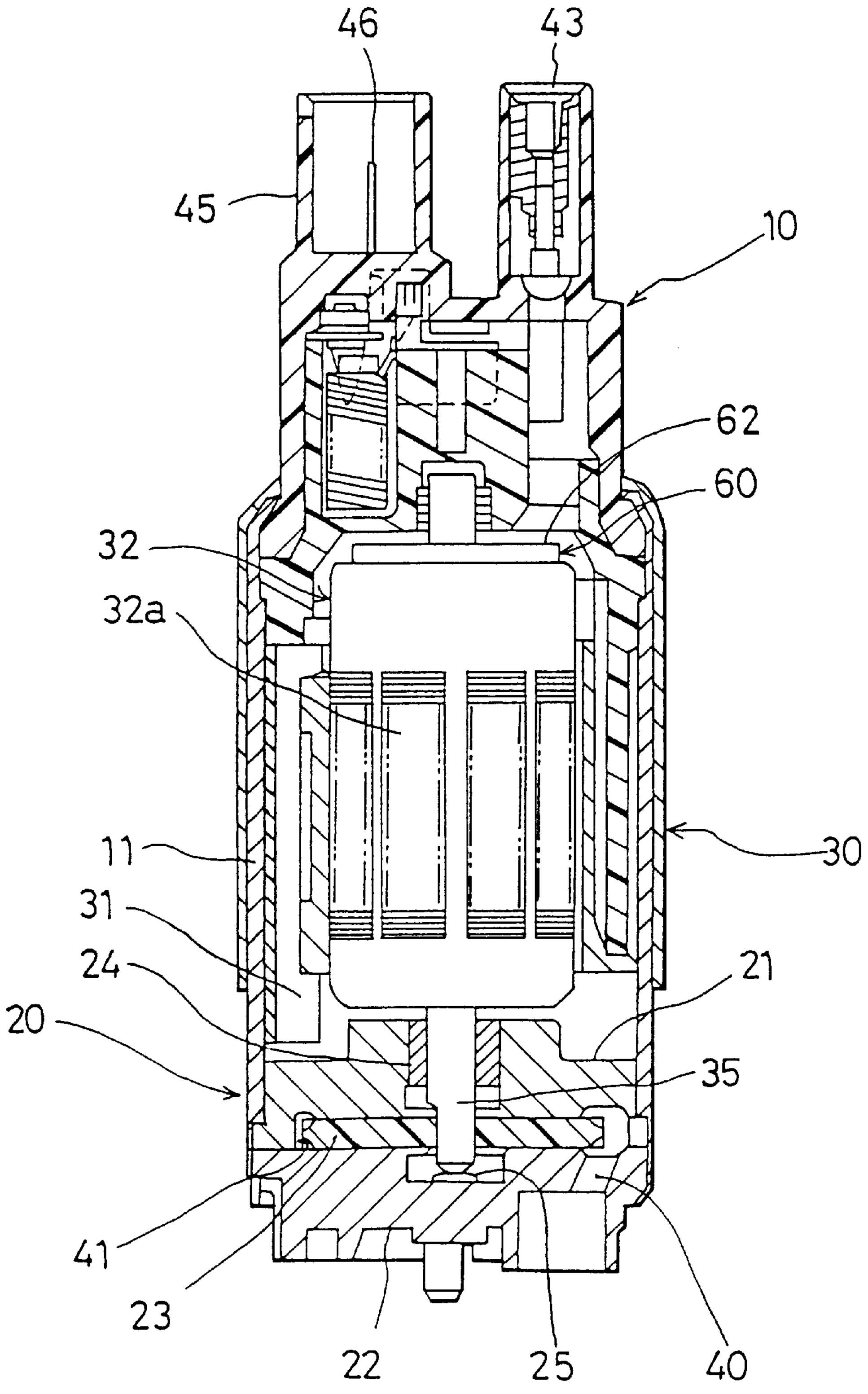
FIG. 1 is a sectional view of a fuel pump unit according to an embodiment of the present invention.

A fuel pump unit which is installed within a fuel tank of an automotive vehicle as an in-tank type is designated by a reference numeral 10 in FIG. 1. The fuel pump unit 10 is comprised of a pump 20 and an electric direct current motor 30 for driving the pump 20. In the motor 30, a plurality of permanent magnets 31 are circumferentially arranged on the inside wall of a cylindrical housing 11. An armature 32 having a core 32*a* and coils (not shown) wound on the core 32*a* is disposed radially inside of the permanent magnets 31 for rotation coaxially therein.

The pump 20 is comprised of a casing body 21, casing cover 22, impeller 23 and the like. The body 21 and the cover 22 are made of aluminum by die casting, while the impeller 23 is made of resin. The body 21 has a fuel passage 41 and receives the impeller 23 rotatably in the fuel passage 41. The body 21 is press-fitted into one axial side of the housing 11. A bearing 24 is fitted into the body 21 at the radial center of the body 21 to support rotatably a rotary shaft 35 of the armature 32. The cover 22 is fixed to the axial end of the housing 11 to cover the impeller 23. A thrust bearing 25 is fixed at the radial center of the cover 22 to receive the thrust load of the rotary shaft 35. The cover 22 has an inlet opening 40 which communicates the fuel passage 41 to the fuel chamber of a fuel tank (not shown). The impeller 23 has vanes on its outer circumference so that, when rotated by the motor 30, fuel in the tank is sucked into the fuel passage 41 through the inlet opening 40 and supplied to an outlet opening 43 through the motor 30.

In the motor 30, a commutator 60 is fixed to one axial end of the armature 32 (upper side in FIG. 1) to receive electric power through a terminal 46 of a connector 45 connectable to a battery (not shown) and brushes (not shown). The commutator 60 has contact parts (sliding contact faces) 62 electrically separated from each other. Each contact part 62 is made of natural carbon mixed with amorphous carbon, while each brush is made of a carbon material mixed with amorphous carbon.

Figure 2:
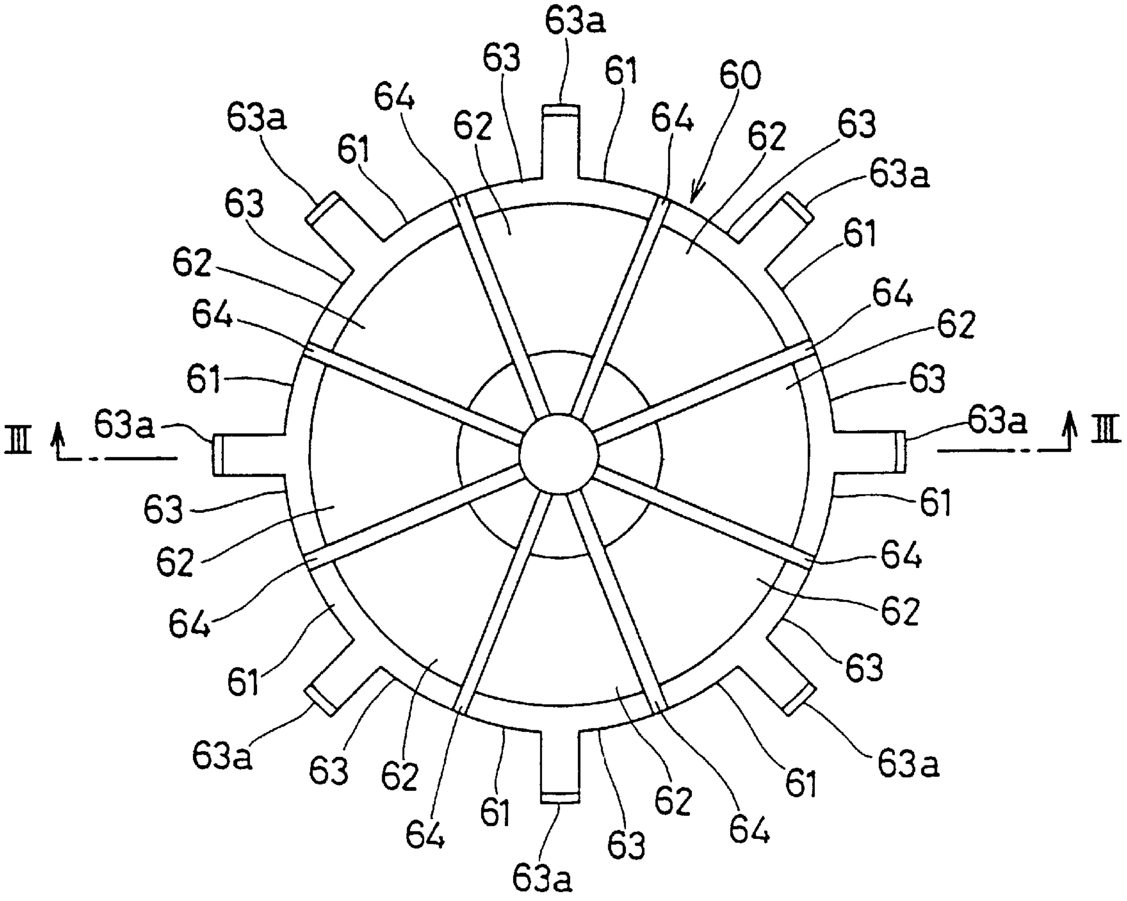
FIG. 2 is a plan view of a commutator used in the embodiment shown in FIG. 1.
Figure 3:
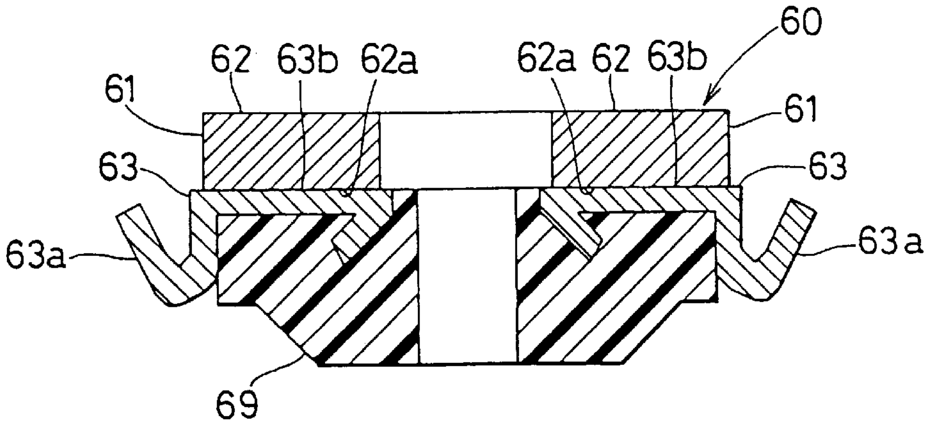
FIG. 3 is a sectional view of the commutator taken along the line III—III in FIG. 2.
Figure 4:
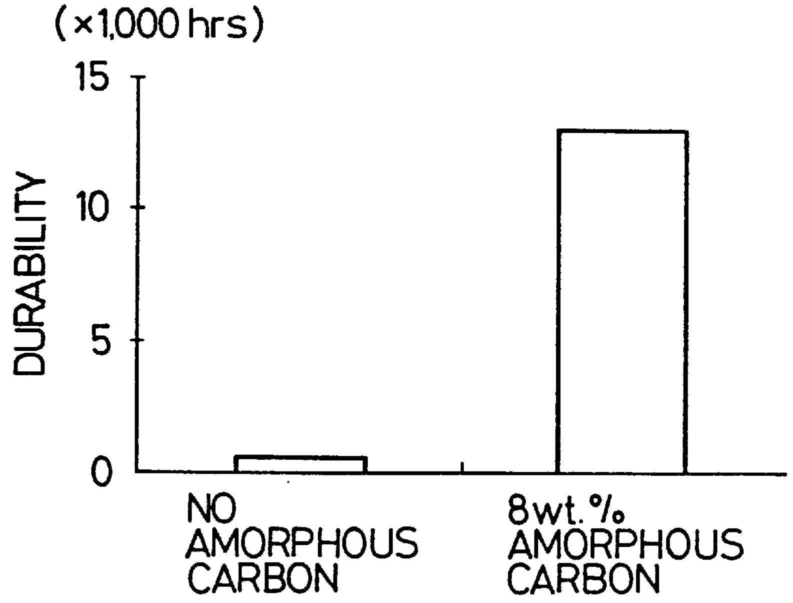
FIG. 4 is a graph showing characteristics of durability of contact parts in the case of using and not using amorphous carbon.

As shown in FIGS. 2 and 3, the commutator 60 is comprised of eight equi-angular segments 61 and a support body 69 made of resin for holding the segments 61 fixedly thereon. Each segment 61 has the contact part 62 and an electric terminal part 63 made of copper and electrically connected to the contact part 62. The terminal part 63 has a nail 63*a* which protrudes radially outwardly for connection with the corresponding coil of the armature 32. The segments 61 may be electrically separated from each other by grooves 64 which extend radially and into the support body 69.

The above commutator 60 is manufactured as follows according to an embodiment.

(1) The surface of a disk-like base material (natural carbon mixed with amorphous carbon) of the contact part 62 which is for contact with a disk-like base material (copper) of the terminal part 63 is nickel (Ni)-plated. This plated surface of the contact part 62 is joined to the terminal part 63 by soldering.

(2) The terminal part 63 is molded with resin which provides the support body 69.

(3) The integral body of contact part 62, terminal part 63 and the support body 69 are cut from the side of the contact part toward the support body 69 to provide the grooves 64 so that the commutator 60 may have eight segments 61 electrically separated by the grooves 64. Each contact part 62 is electrically connected to the corresponding coil of the armature 32 by fusing the nail 63*a* with the corresponding coil.

It is to be noted that the mechanical strength of the contact part 62 becomes weaker as the amount of amorphous carbon mixed with the natural carbon becomes less. Therefore, the wear of the contact part 62 including only a small amount of amorphous carbon progresses faster when sliding on the brush, resulting in shorter durability. A large amount of amorphous carbon in the contact part 62, on the contrary, is likely to cause cracks when the base material of the contact part 62 is sintered.

An experiment was conducted on contact parts, one including no amorphous carbon and the other including 8 wt. % amorphous carbon. In this experiment, each contact part was subjected to 5-ampere electric current supply from the brush made of natural carbon including 8 wt. % amorphous carbon at 8000 revolutions/minute for a period of 500 hours. From the measured wear of the contact parts, expected durability is estimated. As a result, it is ascertained that the latter including 8 wt. % amorphous carbon has a far better durability than the former including no amorphous carbon.

Figure 5:
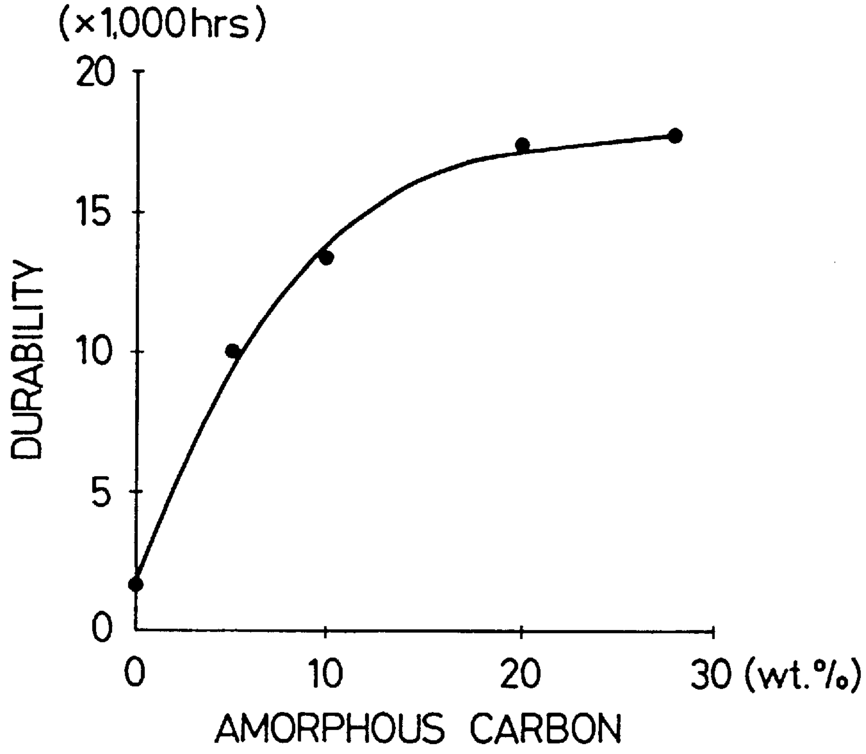
FIG. 5 is a graph showing a relation between weight percentage of amorphous carbon and durability.

According to a further experiment, it was ascertained as shown in FIG. 5 that the weight percentage of amorphous carbon to be mixed with the natural carbon in the range between 5 and 30 (wt. %) will result in longer durability. This range is also effective to reduce cracks. The weight percentage is most preferably at about 20 (wt. %) for both longer durability and less cracks.

It is preferred that the brush is also made of natural carbon mixed with 5–30 wt. % amorphous carbon which has a high electric resistance. This brush having a resultant higher electric resistance is effective to increase the efficiency of conversion from the electric power to the rotary motion and reduce sparks between the brush and the commutator. Further, even in the case that the commutator and the brush are in contact with fuel, no conductive copper sulfide will be formed between the segments. This maintains a good electric insulation between the segments.

The above commutator manufacturing process, particularly the step (1), may be modified in the following manner as an alternative embodiment.

(1) Both of the opposing surfaces of the disk-like base material (natural carbon mixed with amorphous carbon) of the contact part 62 and the disk-like base material (copper) of the terminal part 63 are tin (Sn)-plated to provide respective joint layers 62*a* and 63*b* (FIG. 3) each being a thickness of 10–50 ηm. Thereafter, the joint layers 62*a* and 63*b* are heated up to 230° C. to be melted and joined to each other, while maintaining the layers in contact to each other.

According to this modified manufacturing process, no solder is used for joining the base materials for the contact part 62 and the terminal part 63. Therefore, the manufacturing process can be simplified.

In this modified manufacturing process, the plating metal may be other metals such as magnesium (Mg), aluminum (Al), zinc (Zn), arsenic (As), antimony (Sb), tellurium (The), bismuth (Bi) or the like, as long as it has a low melting point. Each joint layer 62*a,* 63*b* may be provided by a thermal spraying or vapor deposition in place of plating. The thickness of each joint layer 62*a,* 63*b* is most preferably in the range of 20–25 μm for assuring bonding and preventing flow of the layer metal when melted.

Though the commutator 60 in the above embodiments is formed generally in a disk shape to have the contact parts 62 in parallel with the axial side face of the armature 32, it may be formed in a cylindrical shape to have the contact parts perpendicularly to the axial side face of the armature 32. The commutator may be used for any motors other than for use in a fuel pump.

The present invention having been described above should not be limited to the disclosed embodiments and modifications but may be modified further without departing from the spirit and scope of the invention.

What is claimed is:

1. A commutator for a motor, the commutator comprising:

a contact part made of a carbon material including natural carbon mixed with amorphous carbon wherein the contact part is installed within a fuel pump and is disposed for slidable contact with a motor brush while immersed in fuel and wherein the weight percentage of amorphous carbon included in the contact part is in the range of 5 to 30.

2. A commutator as in claim 1, wherein the weight percentage of amorphous carbon is about 20.

3. A commutator as in claim 1, further comprising:

a metal terminal having an electrical conductivity higher than that of iron and electrically connected to the contact part.

4. A commutator as in claim 1, wherein the motor brush is also made of a carbon material mixed with amorphous carbon.

5. A commutator as in claim 4, wherein the carbon material of the brush is natural carbon and the weight percentage of amorphous carbon for the brush is in the range of 5–30.

6. A fuel pump unit for immersion in a vehicular fuel tank, said fuel pump unit comprising:

an electric motor having at least one stationary brush in sliding contact with contact commutator surfaces mounted for rotation with a motor armature;

said contact commutator surfaces comprising a mixture of natural carbon and amorphous carbon; and a fuel pump driven by said rotatable motor armature and wherein the weight percentage of amorphous carbon included in the contact part is in the range of 5 to 30.

7. A fuel pump unit as in claim 6 wherein the weight percentage of amorphous carbon is about 20.

8. A fuel pump unit as in claim 6 wherein said brush also comprises a mixture of natural carbon and amorphous carbon.

9. A fuel pump unit as in claim 8 wherein the weight percentage of amorphous carbon for both the motor brush and commutator contact surfaces is in the range of 5 to 30.

* * * * *